United States Patent [19]

Cole et al.

[11] 3,954,150
[45] May 4, 1976

[54] VEHICLE ROLL PROTECTIVE STRUCTURE

[75] Inventors: Carroll R. Cole; Warren L. Ferriell; Richard E. Guhl; Frederick C. O'Neill; Alfred W. Sieving, all of Decatur, Ill.

[73] Assignee: Caterpillar Tractor Co., Peoria, Ill.

[22] Filed: Jan. 29, 1975

[21] Appl. No.: 545,258

[52] U.S. Cl. ............................. 180/89 R; 280/756; 296/28 C; 296/102; 296/137 R
[51] Int. Cl.² .................. B62D 27/04; B62D 25/20
[58] Field of Search ........................ 180/89 R, 90.6; 296/28 C, 102, 137 R, 137 A, 137 B, 28 R; 280/150 B, 150 C

[56] References Cited
UNITED STATES PATENTS

| | | | |
|---|---|---|---|
| 1,536,182 | 5/1925 | Jackson | 180/90.6 |
| 1,579,570 | 4/1926 | Spangle | 180/90.6 |
| 1,600,988 | 9/1926 | Masury | 296/102 |
| 2,223,395 | 12/1940 | Van Buren | 180/90.6 |
| 3,233,937 | 2/1966 | Barenyi | 296/137 R |
| 3,397,008 | 8/1968 | Timmerman | 280/150 C |
| 3,619,000 | 11/1971 | Marcarus | 296/102 |
| 3,841,430 | 10/1974 | Babbitt, Jr. et al. | 296/102 |
| 3,881,769 | 5/1975 | Metzke | 296/28 C |

*Primary Examiner*—M. H. Wood, Jr.
*Assistant Examiner*—J. D. Rubenstein
*Attorney, Agent, or Firm*—E. C. Goodale

[57] ABSTRACT

A roll protective structure is provided in which a roof panel and floor panel are detachably mounted thereto. The mounting means are such that structural rigidity is maintained while insuring that there is no metal-to-metal contact between the respective panels and cab structure. The respective panels also provide for sound insulation.

9 Claims, 5 Drawing Figures

VEHICLE ROLL PROTECTIVE STRUCTURE

BACKGROUND OF THE INVENTION

This invention relates generally to vehicle cab structures, and more particularly to a vehicle roll protective structure having improved sound attenuating roof and floor panels secured thereto.

Federal legislation imposes stringent limitations upon vehicle manufacturers relative to amount of noise and vibration levels transmitted into the operator area. Such rules and regulations are for the safety and comfort of the operator of the vehicle. It has been found, however, that the requirements of isolation for sound purposes and the rigidity for protection purposes tend to work against each other. In most general cases, resiliently mounting a member for sound insulation reduces the structural rigidity and strength of the member.

Roll protective frames and structures for vehicles are known in the art, as exemplified in U.S. Pat. No. 3,572,819, issued to James C. Moore; U.S. Pat. No. 3,632,134, issued to John H. Babbitt, Jr.; and U.S. Pat. No. 3,841,430, issued to John H. Babbitt, Jr. et al. These patents all provide structural rigidity for the safety of the operator and some sound attenuation.

However, it is a primary object of this invention to provide a vehicle roll protective structure having resiliently mounted floor and roof panels which will provide sound attenuation as well as structural rigidity.

A further object of the present invention is to provide a vehicle roll protective structure that is rugged and effective for operator protection, and provides for sound and vibration insulation for the comfort of the operator.

A still further object of this invention is to provide roof and floor panels for a vehicle roll protective structure which may be easily mounted and removed from the structure, yet complementing the structural rigidity of the roll protective structure when assembled thereto.

SUMMARY

A vehicle roll protective structure incorporates a roof panel and a floor panel each of which is resiliently mounted to the structure. The resilient mounting isolates the panels from the structure so there is no direct metal-to-metal contact. The invention provides for sound and vibration isolation while maintaining the desired structural rigidity of the structure for operator safety.

Other objects, details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF ILLUSTRATED EMBODIMENT

Figure 1:
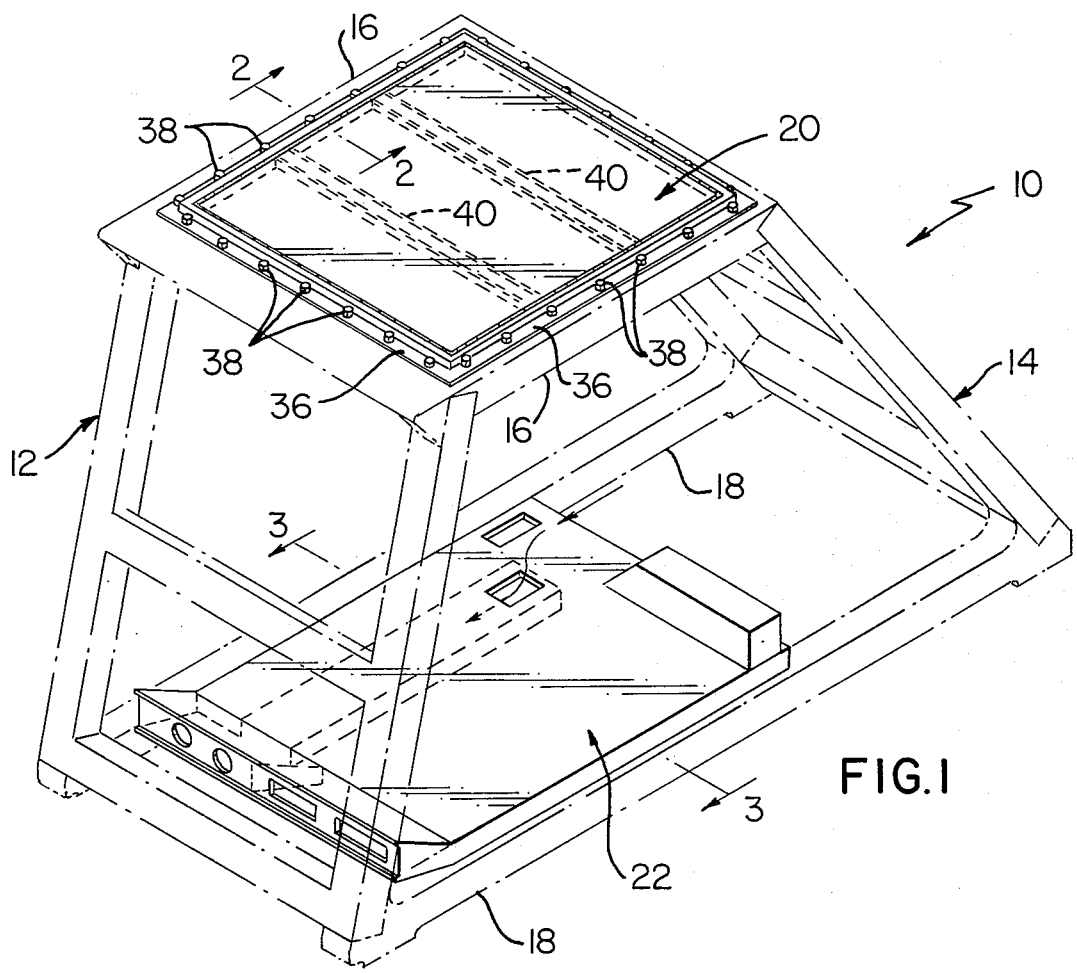
FIG. 1 is a perspective view of the vehicle roll protective structure of this invention, said structure having the sidewalls removed therefrom and being shown in phantom to provide a better view of the roof and floor panels.

Reference is now made to FIG. 1 of the drawings, which illustrates one exemplary embodiment of the vehicle roll protective structure of this invention, which is designated generally by the reference numeral 10. The roll protective structure or cab frame 10 is generally comprised of a front substructure 12, a rear substructure 14, and top and bottom spreader bars 16 and 18, respectively. The spreader bars 16 and 18 serve to separate the front and rear substructures so as to define an operator enclosure area. The cab frame, FIG. 1, is shown in phantom lines so that the roof and floor panels, 20 and 22, respectively, are seen in their entirety.

Figure 2:
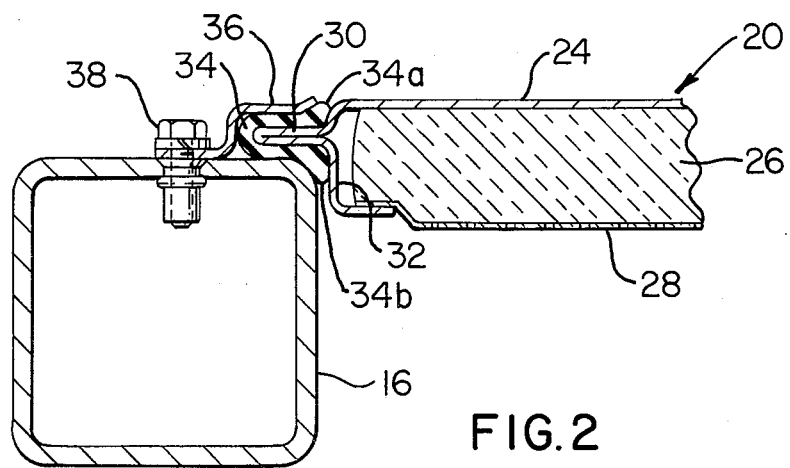
FIG. 2 is a sectional view taken along lines 2—2 of FIG. 1.

The roof panel 20 is comprised of a steel plate 24, insulation 26, and perforated plate or vinyl cover 28, as seen in FIG. 2. The plate 24 is formed with a peripheral edge or lip 30 and a rail portion 32. The peripheral lip 30 is formed so that it will overlap the cab frame when placed in close proximity thereto. The roof panel 20 is isolated from any metal-to-metal contact with the cab frame through the use of a cushioning member such as an elongated rubber grommet or extrusion 34. The rubber cushion 34 extends completely around the peripheral lip 30 of the panel 20. Thus, when the panel 20 is mounted on the cab frame, there is no metal-to-metal contact and the cushion member 34 forms a dirt and air seal.

A clamping strip 36 is used to hold the panel 20 in place upon the cab frame. The clamping strip 36 is detachably secured to the frame, i.e., front and rear substructures and top spreader bars, by any suitable means such as a plurality of nuts and bolts 38. The clamping strip 36 extends around the entire peripheral lip of the panel 20 and thereby restrains the panel 20 from moving away from the cab frame. Reinforcing bars 40 may be secured within the panel 20 to provide additional strength thereto.

With the panel 20 mounted to the cab frame, it is seen that the operator is protected from falling objects by the panel. Should an object, such as a large rock or the like, fall upon the panel 20, the resulting force will cause the rubber extrusions 34 to compress and thereby provide a cushioning effect. Because of the rubber extrusion 34, there is no metal-to-metal contact. It may be seen in FIG. 2 that edge portions 34a and 34b will help in preventing lateral movement of the roof panel 20. The rail 32 will help to retain the shape of the roof panel and keep the upper portion of the cab frame from going out of parallel in case of a vehicle roll over, thereby improving the structural integrity of the structure 10.

Figure 3:
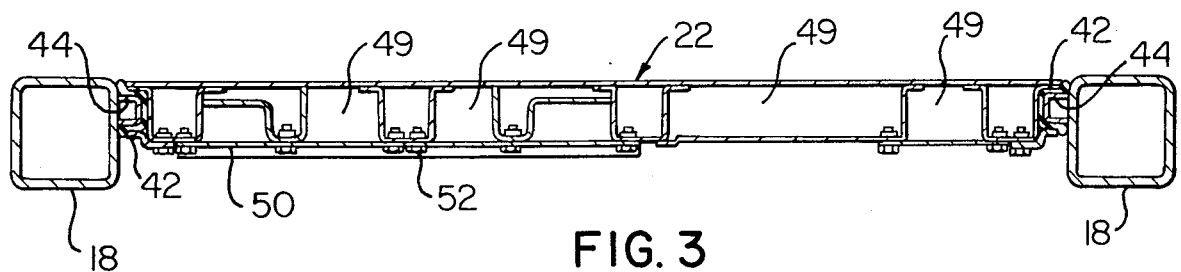
FIG. 3 is a sectional view taken along lines 3—3 of FIG. 1.
Figure 4:
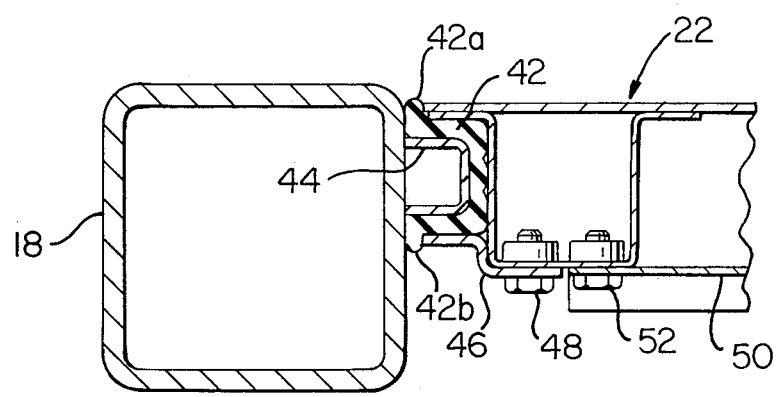
FIG. 4 is a sectional view showing the mounted floor panel.
Figure 5:
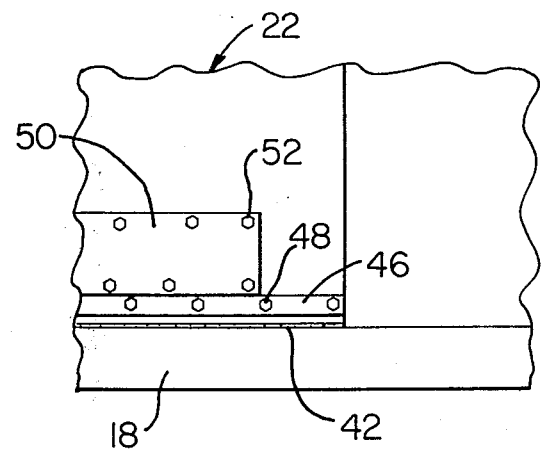
FIG. 5 is a partial bottom view of the floor panel.

The floor panel 22 is isolated from the cab frame through the use of a rubber extrusion or cushion member 42, as best seen in FIGS. 3 and 4. A support member, such as a channel member, bar or similar member, 44 is fixedly secured, by welding or the like, to the bottom spreader bars 18 as seen in FIG. 3, and on bars (not shown) positioned at the front and rear of the floor panel. The rubber extrusion 42 fits between the member 44 and the panel 22, and is held in place through the use of clamping strips 46. The clamping strip 46 is detachably secured to the panel 22 through the use of any suitable means, such as a plurality of nuts and bolts 48. The rubber cushioning extrusion 42 extends around the entire peripheral edge of the floor panel so as to isolate the floor panel from the cab frame and the normal vibration and sound encountered in metal cab structures. The members 44 support the floor panel 22, and in conjunction with the clamping strips 46, prevent any upward movement of the floor panel 22 relative to the structure 10. The lips 42a and 42b of the rubber extrusion 42 help prevent either the floor panel 22 or the clamping strip 46 from having metal-to-metal contact with the cab frame. The extrusion 42 also serves as a dirt and dust seal.

As best seen in FIG. 3, the floor panel 22 comprises a double walled structure and includes longitudinally oriented compartments 49 for cable and hose raceways, as well as heater and air conditioning ducting. The double wall construction serves to provide additional sound deadening characteristics. Covers or plates 50 are detachably mounted to the underside of the floor panel 22 by suitable means, such as nuts and bolts 52. The plates 50 serve as a bottom protective plate for the floor panel 22 and allow easy access to all the enclosed cables and hoses. By enclosing the cables and hoses within the floor panel, the hoses and cables are protected from mud and stones thrown by the front tires of the vehicle.

It can be seen that the roof and floor panel are isolated from the cab structure by the respective rubber extrusion used in securing the panels to the structure. Not only does the rubber extrusion form a cushion mount, but it assists in the sound attenuating function and provides an environmental seal against dirt and air movement into or out of the cab. Structural rigidity of the roll protective structure is maintained through the use of the clamping strips over the entire length of the panel edges. Accordingly, it can be seen that the objectives hereinbefore set forth have been accomplished.

While a present exemplary embodiment of this invention has been illustrated and described, it will be recognized that this invention may be otherwise variously embodied and practiced by those skilled in the art.

What is claimed is:

1. In a roll protective structure for use in off-highway vehicles, the combination comprising:
a cab frame defining an operator enclosure area;
a roof panel to protect the operator, said roof panel including a top plate;
said top plate being formed to have a projecting lip about the periphery thereof wherein said projecting lip overlaps the cab frame when said roof panel is placed in close proximity to said frame;
elongated mounting means removably attached to said cab frame and overlapping the entire length of said projecting lip, thereby securing said roof panel to said cab frame to cover the entire ceiling area;
resilient means mounted about said projecting lip to resiliently support in isolating fashion and to prevent metal-to-metal contact between said panel lip and said cab frame and said mounting means;
a floor panel;
second mounting means removably securing said floor panel to said cab frame; and
second resilient means operatively associated with said floor panel to resiliently support in isolating fashion said floor panel from said cab frame and said mounting means.

2. The combination as set forth in claim 1 in which said top plate terminates in a rail portion extending downwardly from said lip wherein said rail portion provides structural rigidity to prevent bending of said roof panel.

3. The combination as set forth in claim 2 in which said mounting means is an elongated clamping strip, said strip having one edge connectable with said cab frame and the other edge acting against said resilient means.

4. The combination as set forth in claim 3 in which said resilient means is an elongated rubber element extending the entire length of said panel peripheral lip and extending over the top and bottom of said lip.

5. The combination as set forth in claim 1 further comprising a support member fixedly secured to said cab frame along the bottom thereof, said support member being used to support said floor panel thereupon.

6. The combination as set forth in claim 5 in which said floor panel has a peripheral edge projecting therefrom and in which said second resilient means is an elongated cushioning member mounted about said support member wherein said floor panel peripheral edge is supported on said cushioning member.

7. The combination as set forth in claim 6 in which said second mounting means comprises an elongated clamping strip, one elongated edge of said strip being detachably secured to said floor panel and said strip other elongated edge engaging said cushioning member on the side of said support member opposite the panel edge supporting side wherein said floor panel is supported by said cushioning member about its entire peripheral edge and said clamping strip prevents relative upward movement between said floor panel and said cab frame.

8. The combination as set forth in claim 7 in which said floor panel has a double wall, said double wall defining passageways therebetween wherein vehicle hoses and cables and the like may be passed therethrough.

9. The combination as set forth in claim 3 comprising a support member fixedly secured to said cab frame along the bottom thereof; said floor panel having a peripheral edge projecting therefrom; said second resilient means being an elongated cushioning member placed about said support member wherein said floor panel peripheral edge is supported on said cushioning member; said second mounting means being an elongated clamping strip, one edge of said strip being detachably secured to said floor panel and said strip other edge engaging said cushioning member on the opposite side of said channel member wherein said floor panel is supported by said cushioning member about its entire peripheral edge and said clamping strip prevents relative upward movement between said floor panel and said cab frame.

* * * * *